March 31, 1942. E. M. MEYER 2,278,330
MULTIPOST LINE INSULATOR
Filed Aug. 4, 1939
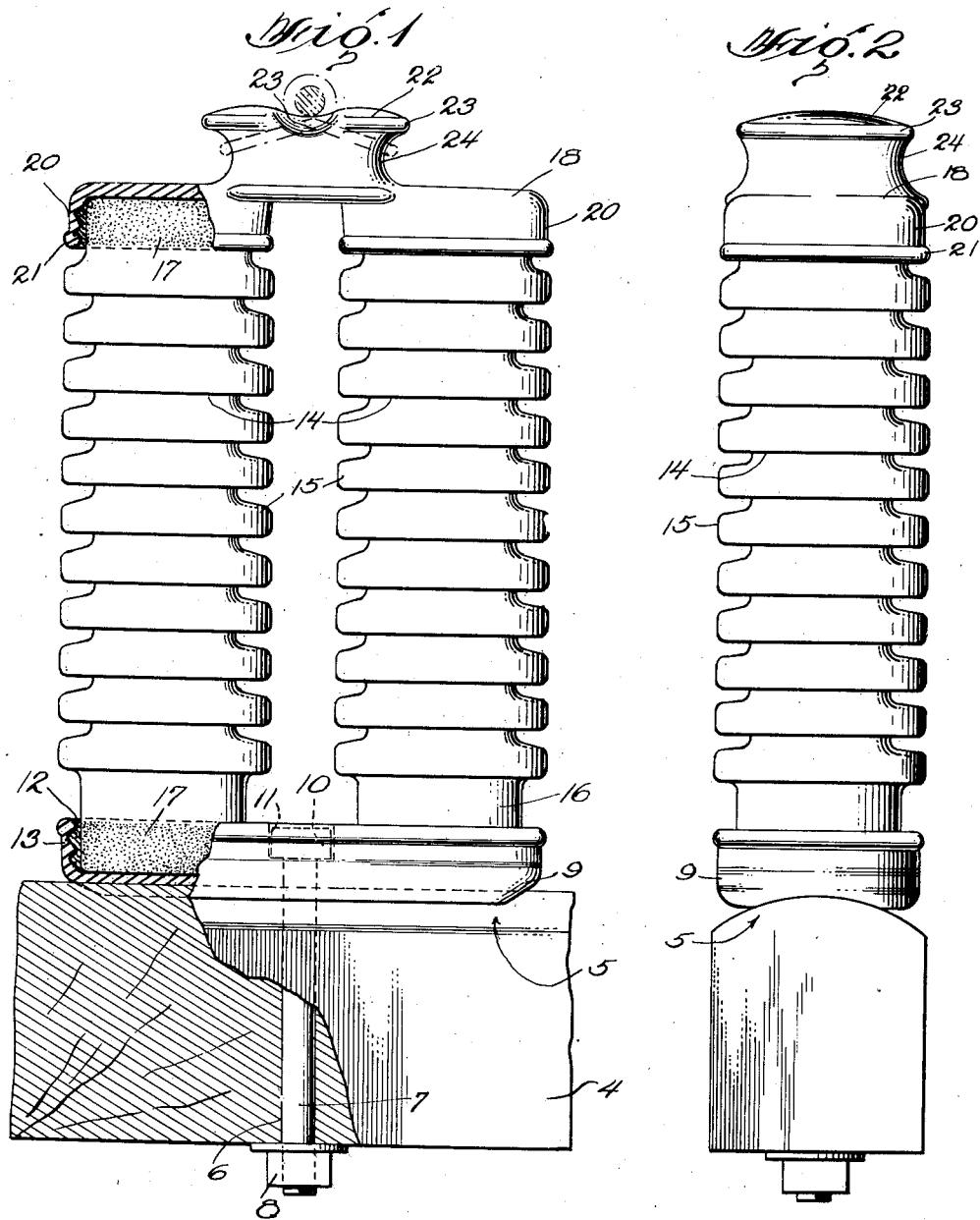
Inventor
Edwin M. Meyer
By Elmer Stuart
Attorney Patented Mar. 31, 1942

2,278,330

UNITED STATES PATENT OFFICE 2,278,330

MULTIPOST LINE INSULATOR

Edwin M. Meyer, Parkersburg, W. Va., assignor to Porcelain Products, Inc., Findlay, Ohio, a corporation of Ohio Application August 4, 1939, Serial No. 288,431

3 Claims. (Cl. 174—148)

The description which follows relates to novel improvements in insulators for electric transmission lines. Transmission lines of this type carry current at high voltage. It is essential that such insulators shall have low dielectric capacitance between live line and grounded support with resultant low field intensity and low voltage gradient between these parts.

It is generally understood that high field intensity and high voltage gradient between live and ground electrodes will cause local overstressing of the air spaces surrounding these electrodes. This local overstressing causes localized arcing or corona in these places. This corona or local breakdown of the air, in addition to representing a direct loss of transmission energy, generates high frequency oscillations which will travel over the transmission wires and will be disseminated into the surrounding medium to cause interference in nearby radio broadcast receivers. I have found that it is feasible to construct insulators for electric transmission circuits which will permit the wires to be supported from beneath with a reduction in the size and weight of the insulators and without causing the above mentioned objectionable conditions around the transmission line.

More particularly I have developed a supporting insulator for high tension electric transmission which may be installed as a unit. It results in efficient and improved electrical characteristics while at the same time from a practical viewpoint the insulator offers advantage in minimum weight and economy.

The term "support" is used in this specification in its accepted meaning of upholding or sustaining from beneath. This is particularly significant since the insulating elements are of electrical porcelain. This material has its strength directly increased when the material is put under compression as is the case when it sustains the weight or stress imposed by a conductor or transmission line.

Conversely the strength is diminished when the stress is that of tension. Accordingly the invention relies for its effectiveness on the use of the insulating material in compression and this is clearly indicated by the use of the term "support."

In order to explain the invention in detail, I have illustrated the preferred form by way of example in the accompanying drawing in which Fig. 1 is a side elevation partly in section of the insulator;

Fig. 2 is an end view in elevation and

Fig. 3 is a fragmentary enlarged vertical section showing the detail of assembly.

Broadly considered, the invention consists in supporting the wire-holding fixture by two or more parallel insulating members held in a base. The mechanical advantages of such an arrangement are of course evident, the truss or framed construction giving increased strength and resistance to fracture. The electrical advantages of this arrangement are derived from the fact that a large separation is effected between line and ground electrodes, the space between being occupied solely by air and insulating material. This results in the very desirable feature of low capacitance and low field intensity mentioned above with its associated advantage of freedom from radio interference. These features and advantages are not obtainable in the conventional pin type insulator or cap and pin type suspension or switch insulator. The insulator is of such a form that it may be shipped as a unit and can be rigidly mounted upon a steel or wood cross arm or analogous support.

In the drawing, 4 represents a cross arm of the usual type made of wood and having its upper surface 5 convex. This cross arm has the usual vertical holes 6 for holding the pin or bolt of the insulator. This construction is applicable to transmission lines of either low or high tension. It is of course possible to use material other than wood as there is no necessity of considering this cross arm as an insulator.

The attaching means for the insulator comprises a square headed bolt 7 with a washer and square nut 8. A special feature of this design is the fact that it is possible to use a standard machine bolt and nut for attaching the insulator to the arm. All other types of insulators require a special bolt, pin, or stud of some sort. Another exclusive feature is the recess in the base casting for the head of the bolt, serving to lock the bolt in position so that the insulator may be tightened in place with one wrench. The recess also affords the maximum clearance between line and ground electrodes and eliminates field concentration and static discharge at the bolt head.

The insulator has a base member or ground terminal 9. This base has a concave or channeled bottom conforming to the convexity 5 of the top of the cross arm 6. This insures the proper positioning of the insulator upon the cross arm when the square head 10 of the bolt is held in the recess 11 of the base. The base may be made of cast steel, bronze, brass, aluminum, malleable iron or other suitable alloy and is provided with two or more circular sockets 12. The inner wall of each socket 12 has peripheral ribs or threads to increase the firmness by which the insulator proper may be held in attachment by the cement.

The insulators 14, 14 are the usual cylindrical type which may be hollow or solid. These insulators are made of porcelain of a type approved for its electrical properties. The outer cylindrical surface of each insulator may be smooth or provided with a series of lateral ribs or petticoats 15, 15. The outer surface of the porcelain is of course given an appropriate glaze. The lower end 16 of the porcelain is of somewhat reduced diameter permitting its being received in the socket 12. The end of the insulator within the socket is sanded as at 17 in the usual manner to provide a grip for the cement.

The insulators 14, 14 extend parallel and upwardly from the sockets 12, 12.

The upper ends of the sockets are held in a bridge member or line terminal 18. This bridge member may be also made of any suitable metal or alloy. In form it provides two or more inverted cups or sockets 20, 20 which are spaced apart as shown in Fig. 1. Each inverted socket has internal ribs or screw-threads 21. Centrally of the bridge member and extending vertically therefrom is a boss 22. This boss is in the usual form of insulator head or terminal suitable to support a conducting wire. For this purpose it has in its top surface a depression or groove 23 which runs parallel to or overlies the space between the inverted sockets 20, 20. This head provides the usual facility for holding the line wire in the groove 23 by means of tie wires running in groove 24. (See Fig. 1.)

It is desired to point out, however, that by providing a space between the inverted sockets 20, 20 a tie wire may be run in crossed directions over the conductor and through the space thus forming an improved method of attachment not ordinarily provided without weakening the head by cross passageways.

The sockets 12 and 20 are lined with plastic coating 25 made of asphalt or similar material providing a certain amount of resilience. Cement 26 is used to fill in the sockets between the lining 25 and the sanded ends 17 of the insulator. In this way the insulators are firmly cemented and anchored in the sockets.

The electrical characteristics of an insulator assembled in the above manner are most satisfactory. Where the porcelain insulators are exposed for a distance of twelve inches between the opposite edges of the cups or sockets 12 and 20, and the bolt head 10 is recessed, this provides a dry arcing distance of the same length. The leakage distance between the terminals is over twenty-five inches. The dry arc over voltage is 130,000 volts and the wet arcover voltage 85,000 volts. The bifurcated arrangement using two parallel insulators as branches maintains the satisfactory electrical characteristics and at the same time gives added rigidity and strength.

The mode of assembly and the use of the improved insulator will be readily understood from the above description. The insulator is convenient in size, moderate in weight and easily transported. It is assembled as a unit on the cross arm by the use of a single attaching bolt 7. This insures its proper position and holds it rigidly in place. The high tension transmission conductor is held in the usual manner in the groove in the top of the boss and can be tied in place by a tie wire not only in the usual manner but also by a wire passing underneath the boss and between the inverted sockets. The increased extent of the edges of the socket reduces the field intensity. Thus the corona point of the insulator and the minimum starting voltage for radio interference will be extremely high.

I have illustrated the preferred form by way of example but it will be evident that the invention may be embodied with minor changes in design and proportions without departing from its scope as defined in the following claims.

What I claim is:

1. A line wire supporting insulator comprising a base having means for attachment to a support, and two spaced, upwardly faced sockets, parallel insulators mounted endwise in said sockets, a bridge member having spaced, inverted sockets receiving the ends of said insulators and an integral laterally ribbed boss projecting upwardly from said bridge member and having a wire-holding groove overlying the space between said inverted sockets.

2. A line wire supporting insulator comprising a base having means for attachment to a support and two spaced, upwardly faced sockets, a cylindrical insulator mounted endwise in each socket, a bridge member having inverted projecting socket members projecting downwardly therefrom and receiving the opposite ends of said insulators and an integral wire-holding head projecting upwardly from said bridge member opposite the space between the socket members.

3. A line wire supporting insulator comprising a base having a pair of spaced, upwardly faced circular sockets and a central irregular recess, correspondingly shaped means within said recess and wholly below the upper surface of the base for attaching it to a support, a pair of substantially cylindrical insulators mounted endwise in said sockets, a bridge member having a pair of inverted cup-shaped sockets spaced to receive the upper ends of said insulators, an intermediate portion connecting said last-named sockets and spaced above the lower plane of the sockets and an integral ribbed boss superimposed on said intermediate portion.

EDWIN M. MEYER.